United States Patent [19]

Lux

[11] 4,134,134

[45] Jan. 9, 1979

[54] APPARATUS FOR PICTURE PROCESSING

[75] Inventor: Peter Lux, Hamburg, Fed. Rep. of Germany

[73] Assignee: U.S. Philips Corporation, New York, N.Y.

[21] Appl. No.: 804,719

[22] Filed: Jun. 8, 1977

[30] Foreign Application Priority Data

Jun. 10, 1976 [DE] Fed. Rep. of Germany ....... 2625973

[51] Int. Cl.$^2$ .............................................. H04N 1/40
[52] U.S. Cl. ............................ 358/280; 340/347 DD; 358/133; 358/138; 358/260; 360/8; 364/515
[58] Field of Search ............... 358/260, 280, 133, 138; 364/515; 340/347 DD; 360/8, 9

[56] References Cited

U.S. PATENT DOCUMENTS

| | | | |
|---|---|---|---|
| 3,810,019 | 5/1974 | Miller | 325/40 |
| 4,048,658 | 9/1977 | Nakagawa | 360/9 |

OTHER PUBLICATIONS

Wintz, "Picture Transform Coding," Proceedings of the IEEE, vol. 60, No. 7, Jul. 1972, pp. 809–820.

*Primary Examiner*—Howard W. Britton
*Attorney, Agent, or Firm*—Frank R. Trifari; Jack E. Haken

[57] ABSTRACT

A Hadamard domain encoder wherein adding and subtracting operations on digitized intensities of 2 × 2 picture points yield secondary results. Likewise processing of groups of 2 × 2 secondary results yields further intermediate and/or final results. The complement of unprocessed secondary and final results fully characterizes the original picture but is better suited for data storage and/or transfer because the energy content of the picture is substantially restricted to a limited region. Redundancy in the stored/transmitted data is thus reduced.

12 Claims, 6 Drawing Figures

$$\begin{bmatrix} 1 & 1 \\ 1 & -1 \end{bmatrix} \cdot \begin{bmatrix} 8 & 3 \\ 7 & 1 \end{bmatrix} \cdot \begin{bmatrix} 1 & 1 \\ 1 & -1 \end{bmatrix} = \begin{bmatrix} 19 & 11 \\ 3 & -1 \end{bmatrix}$$

$$\begin{bmatrix} 1 & 1 \\ 1 & -1 \end{bmatrix} \cdot \begin{bmatrix} 19 & 11 \\ 3 & -1 \end{bmatrix} \cdot \begin{bmatrix} 1 & 1 \\ 1 & -1 \end{bmatrix} = \begin{bmatrix} 32 & 12 \\ 28 & 4 \end{bmatrix}$$

$$\begin{bmatrix} 1 & 1 \\ 1 & -1 \end{bmatrix} \cdot \begin{bmatrix} A1 & A2 \\ A3 & A4 \end{bmatrix} \cdot \begin{bmatrix} 1 & 1 \\ 1 & -1 \end{bmatrix} = \begin{bmatrix} B1 & B2 \\ B3 & B4 \end{bmatrix}$$

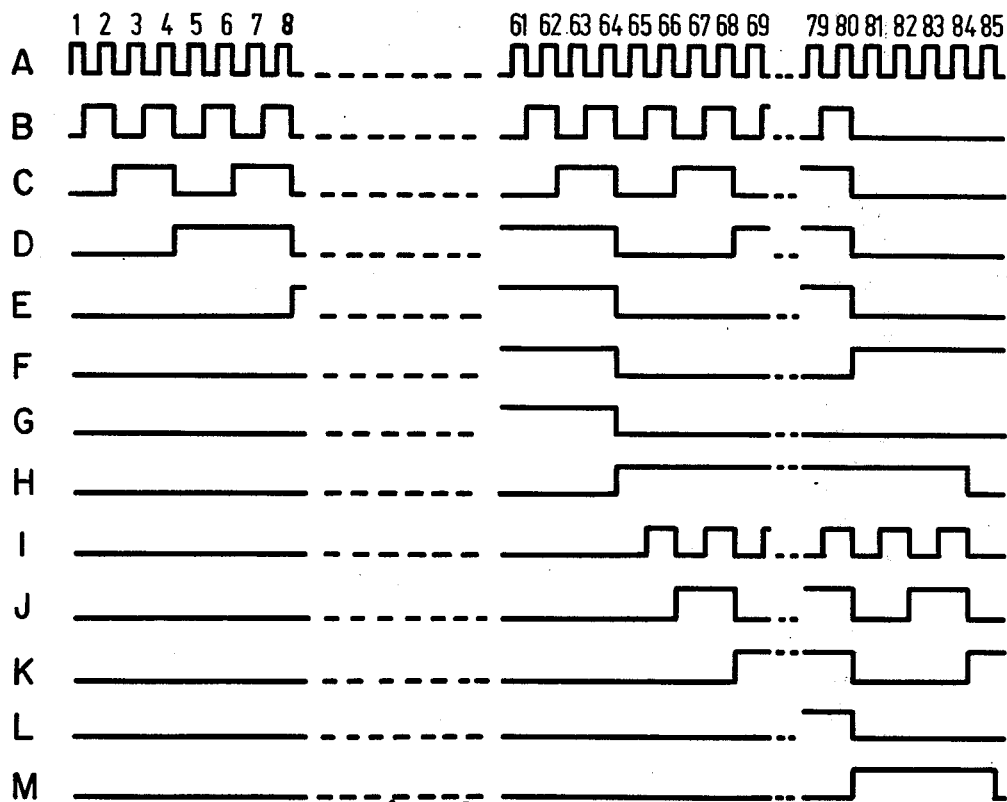

APPARATUS FOR PICTURE PROCESSING

BACKGROUND OF THE INVENTION

The invention relates to apparatus for picture processing comprising an input for receiving digitized values of picture points situated within a predetermined matrix area of $2^N \times 2^N$ points within said picture according to a predetermined sequence among said points.

Certain methods for picture processing have been described in a paper by P. A. Wintz, Transform Picture Coding, Proc. IEEE, 60 (7207); 809–820. Several possibilities described therein include, among others use of Fourier-transforms and Hadamard transforms. Such methods for picture transform are used for compressing the picture energy to a restricted area of the picture matrix. In unprocessed pictures this energy is spread out quasi-statistically over the whole picture. By means of such methods the energy of the remainder of the picture is quite limited and it has been found that now the picture may be translated into a code with substantially restricted number of code elements. The data of the processed matrix may then be applied to a quantizing member where by code values below a predetermined critical value are suppressed so that an appreciable reduction of redundancy and of irrelevant information is effected. A processed picture may thus be stored or transmitted over a data device having a restricted capacity. The amount of the reduction thus reached depends on the specific transforms used. Known methods yield results which are quite different for different pictures and often appear to give less than optimum-results.

It is an object of the invention to provide apparatus for executing an improved transform method. Specifically, square pictures of $2^N \times 2^N$ matrix points are considered. Notably pictures with restricted amounts of contrast are considered, such as X-ray pictures. The invention provides a substantial compression of the information contained in the picture. It is a further object of the invention to provide an apparatus which is extremely simplified in operation.

SUMMARY OF THE INVENTION

Apparatus for picture processing comprising an input for receiving digitized data values of picture points situated within a predetermined matrix area of $2^N \times 2^N$ points within said picture according to a predetermined sequence among said points, said input being connected to a first input of a storage means having first and second inputs and first and second outputs and a plurality of separately addressable locations, said apparatus further comprising correlating means having its input connected to said first output and its output connected to said second input for receiving the data values stored in subgroups of four of said locations and for multiplying the data values of each subgroup with data constituting the basic Hadamard matrix of second order [H2] for generating the sums of said data values and three further correlated data values and for producing the resultant data values on its output, said storage means being adapted for storing data values received on its first and second inputs according to a predetermined first address sequence, said storage means being adapted for accessing all data values therein received and stored from its first input and all data values of said sums only once according to a predetermined second address sequence and producing the accessed data values in subgroups of $2 \times 2$ accessed locations on its first output, the data values of each subgroup having been correlated the same number of times p in said correlating means and representing the digitized data of $2^{p+1} \times 2^{p+1}$ picture points. Advantageously the value of p is equal to N. Thus the division into subgroups may indicate the sequence in which the picture points are processed. The basic Hadamard matrix comprises only the elements +1, −1; accordingly $$[H2] = \begin{bmatrix} +1 & +1 \\ +1 & -1 \end{bmatrix}.$$

Therefore, the correlation transformation reduces to one or more short sequences of addition/subtraction operations.

Further Aspects of the Invention

Advantageously $2^{p+1} \times 2^{p+1}$ picture points represent all picture points within a block of consecutively arranged picture points. Both from an organizational point of view, as given by the scanning sequence of the picture, and for optimally reducing the picture redundancy; local gradients of the picture point intensities are taken into account only one or a few times, while the local average intensity is considered more often in the processing sequence.

Advantageously, said storage means has means for producing the digitized data values stored therein at its second output (according to a third address sequence) after termination of the second address sequence. Said data values are then applied to an input of quantizer means for generating quantized data values. The quantizing process results in an effectively reduced redundancy. Advantageously, said third sequence utilizes those data values which were correlated p times before utilizing those data values which were correlated (p−1) times. Said sequence starts with a partial sequence of sums for the highest value of p and comprises, for each value of p, first, second and third partial sequences. The first partial sequence includes correlated data values indicating a brightness variation in a first scanning direction within said subgroup; the second partial sequence includes correlated data values indicating a brightness variation in a second scanning direction; and the third partial sequence includes the remaining correlated data values. An efficient organization thus results.

BRIEF DESCRIPTION OF THE FIGURES

FIG. 1 is an example of a correlation with the basic Hadamard transform of the second order.

FIG. 2 is a timing diagram.

DETAILED DESCRIPTION OF THE INVENTION

FIG. 1 gives an example of the correlation with the Hadamard transform of the second order. The Hadamard matrix has the four elements 1, 1, 1, −1. In this example four picture points are shown as having the intensities A1, A2, A3, A4 as 8, 3, 7, 1, respectively, as shown in the upper line. The general outline of the correlation is shown in the lower line of FIG. 1.

The correlation consists of two matrix multiplications. The following expressions apply for the elements of the resultant 2×2 matrix:

$B1 = A1 + A2 + A3 + A4$ $B2 = A1 - A2 + A3 - A4$ $B3 = A1 + A2 - A3 - A4$ $B4 = A1 - A2 - A3 + A4$

It may be easily demonstrated that correlation of the resultant 2 × 2 matrix with the elementary Hadamard matrix will yield the result $$\begin{bmatrix} 4A1 & 4A2 \\ 4A3 & 4A4 \end{bmatrix}$$

(An example thereof has been given in the middle line of FIG. 1). Therefore, correlation with a Hadamard matrix does not destroy any information. The transformed matrix (B1-B4) of the upper line the values of the four points indicates the following aspects of the original matrix (A1-A4), (assuming that the four indicated values correspond to the same geographical dispositions of the picture points to which they refer: i.e. left/right, upper/lower points). B1 refers to the sum of all intensities. B2 refers to an intensity gradient from right to left; B3 refers to an intensity gradient in the upward direction; B4 refers to an intensity ridge or valley in a diagonal direction.

Figure 3:
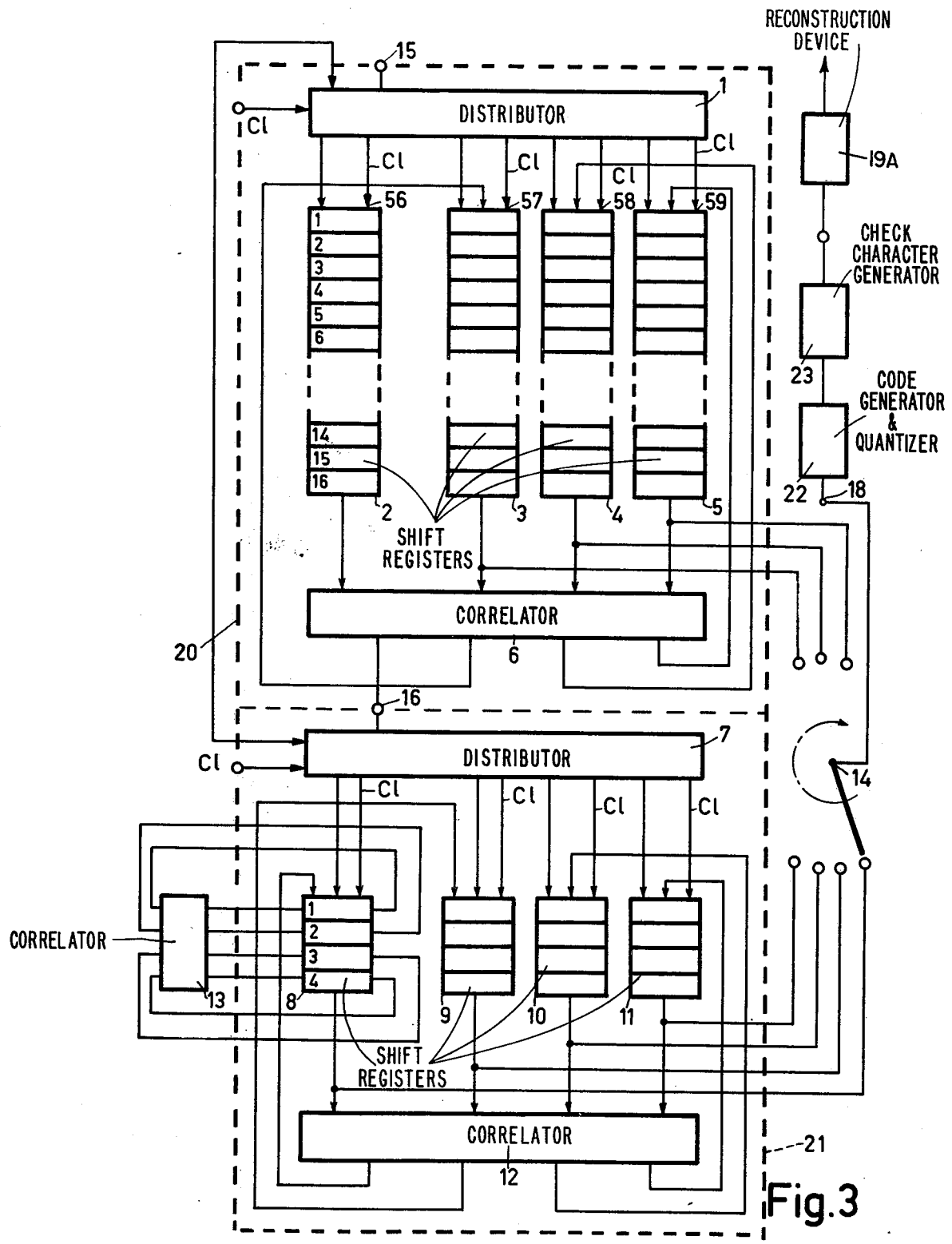
FIG. 3 is an apparatus according to the invention.

FIG. 3 shows an apparatus according to the invention. The derivation of the original picture points has not been shown and falls outside the scope of the invention. In the preferred embodiment the picture consists of $2^N \times 2^N$ points, and the complete apparatus for N = 3 has been shown. If the original picture is too large for transforming in the apparatus, it may be divided into partial pictures of $2^N \times 2^N$ picture points each. If the picture to be processed is smaller than $2^N \times 2^N$ points, notably if it is a rectangle instead of a square, the remaining points may be added as notional points, all having either full or zero picture intensity, or the expected average intensity. However the generation of additional points has not been shown for simplicity and the preferred embodiment deals with a single picture of $2^N \times 2^N$ picture points. It should be noted that horizontal and vertical spatial periods may differ. It is also assumed that the picture is scanned by means not shown as in conventional reading: from left to right, each line being directly below the foregoing line.

The device according to FIG. 3 is adapted for transforming a picture of 8 × 8 picture points. The apparatus comprises a first sub-device 20 and a second sub-device 21. If the picture is 16 × 16 points a third sub-device would have to be arranged with its output connected to input 15 of sub-device 20 and its input connected to the output of the device for delivering the digitized data of the picture point intensities (not shown). The functional operation and construction of such third and possibly further sub-devices completely corresponds to sub-device 20, but with increased storage capacity, as will be explained. The picture point intensities of the 64 picture points are digitzed to a binary code by a device not shown and are presented serially (according to rows) to the input 15 of the first sub-device. A distributor 1 operates to alternately present the values of the first picture line to shift registers 2 and 3, and the values of the second picture line to the shift registers 4 and 5. The values of the third picture line are then presented to shift registers 2 and 3 and so on.

Figure 4:
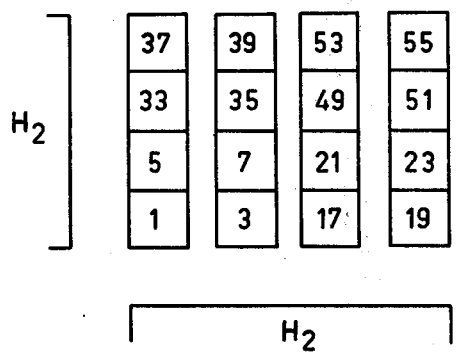
FIG. 4 is the arrangement of the picture point data values.

FIG. 4 shows the distribution of picture points to the shift registers in FIG. 3. FIG. 4a shows a picture consisting of 8 × 8 picture points, which have been numbered as indicated.

FIG. 4b shows the distribution of the information corresponding to these 64 picture points among the four shift registers of the first sub-device 20 in FIG. 3. For a picture of $2^N \times 2^N$ points, each of the shift registers has a capacity of at least $2^N \times 2^{N-2}$ points (in this example 16 points). If the picture is black and white and the intensity is coded in 32 greyness levels each stage of a shift register accommodates five bits in corresponding cells. The cells of each stage are shifted in parallel, so that a single clock pulse cycle is sufficient for shifting the information content by one stage.

Figure 5:
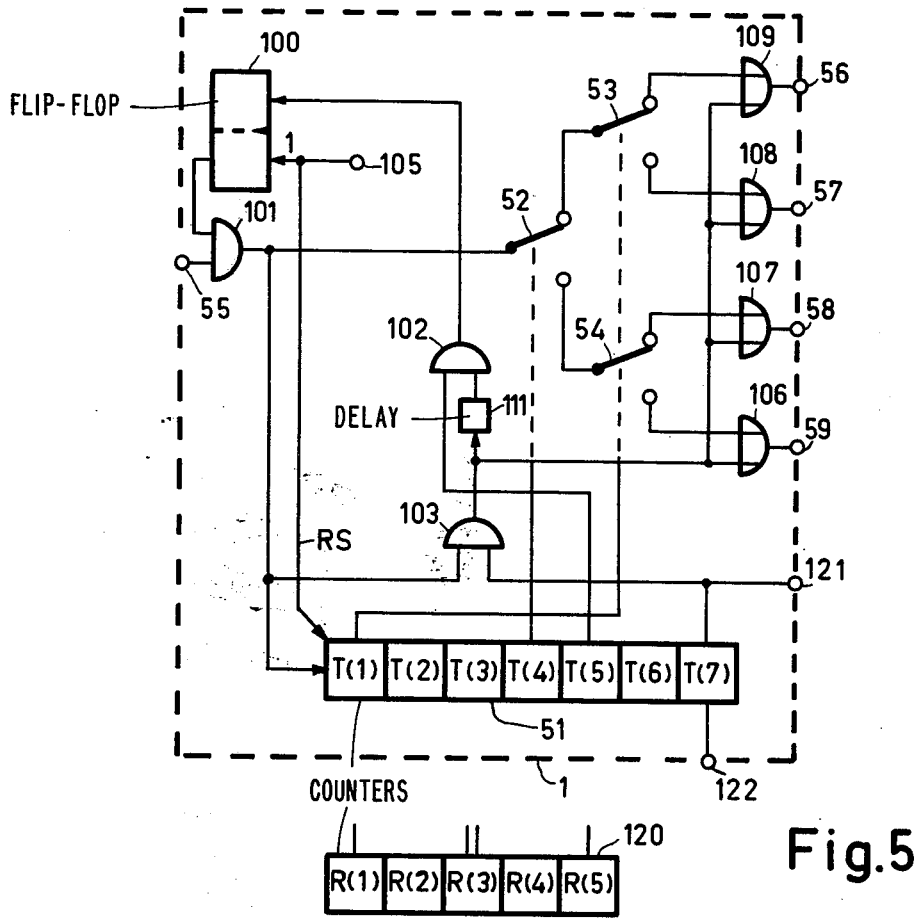
FIG. 5 is a control for a distributor.

The distribution device, 1, contains a plurality of multiplexer stages which in practice are built from electronic components (gates), but which have been shown for simplicity in FIG. 5 as mechanical switches 52, 53 and 54. In the above mentioned situation (32 greyness levels) each switch has to switch five signals in parallel. Furthermore, the distribution device must provide shift pulses to the shift register as additional data values are received. Thus, the shift pulses are distributed in the same manner as described with respect to the data routing in FIG. 5. Alternatively certain known shift registers, such as the well known type SN 7496 will only store information received if a shift pulse is present. Otherwise any data change on the input is without effect. With this type of shift register only the shift pulses have to be distributed, while the data can be presented to all shift registers in parallel. In the following the latter case is assumed to apply, and FIG. 5 this only shows the distribution of the clock/shift pulses.

The switch 52 and the parallel-arranged switches 53/54 are controlled by the output signals of a binary counter 51. The position shown is the initial position of counter 51 which may be initialized by a reset signal on terminal 105 (from a source not shown). This reset signal also switches a flipflop 100 to its "1" position unblocking an AND-gate 101. A record AND-gate 103 is thus blocked. A first shift pulse on input 55 is now transmitted through switches 52, 53 and OR-gate 109 to output 56 which is connected to a shift pulse input of shift register 2. The rear edge of the first shift pulse advances counter 51 by one position, thereby activating switching of switches 53 and 54. The second shift pulse is then transmitted to output 57 and thence to shift register 3. The rear edge of this second shift pulse again activates switching of switches 53 and 54, and enables routing of the data value of the next point into shift register 2.

After $2^N$ (in the example: 8) shift pulses the first row of picture points has been stored in the first two shift registers. The rear edge of this eighth pulse changes the state of stage T(N + 1)(T(4) in this example). The output signal of stage T(4) controls the second position of switch 52. In similar way as described hereabove, the data of the next row of picture points are stored via outputs 58 and 59 in the next two shift registers 4 and 5. After this row has been stored the stage T(4) is again switched and the initial state is assumed for storing the data of the third row of picture points in shift registers 2 and 3.

If the capacity of the shift registers corresponds to the number of data values to be stored; the values of points 1, 2, 9 and 10 in FIG. 4a will just reach the output of the shift registers when the value of the last point (64) is stored. At that time these four points are applied to a correlator 6 for execution of correlator steps therein. The processing 6 is adapted for correlating four input signals corresponding to the four picture points of a 2 × 2 submatrix with the basic Hadamard-Matrix symbolized by [$H_2$].

Data storage has thus necessitated 64 shift pulses. The rear edge of the last one of these puts stage T(2N + 1) = (T(7)) in the "1" position, unblocking AND-gate 103. Therefore, irrespective of the positions of switches 52–54, all shift registers 2–5 receive further clock pulses through AND-gates 101 and 103 and the respective OR-gates 106–109 and will produce output signals for processing four points at a time. The rear edge of the sixteenth of this second series of shift pulses will drive stage T(N + 2) = (T(5)) to the "1" position whereby AND-gate 102 becomes transmissive for the last shift pulse edge which is delayed by a small amount in an inverting delay element 111. Flipflop 100 is thus reset, blocking AND-gate 101 from transmitting any subsequently received shift pulses.

Figure 6:
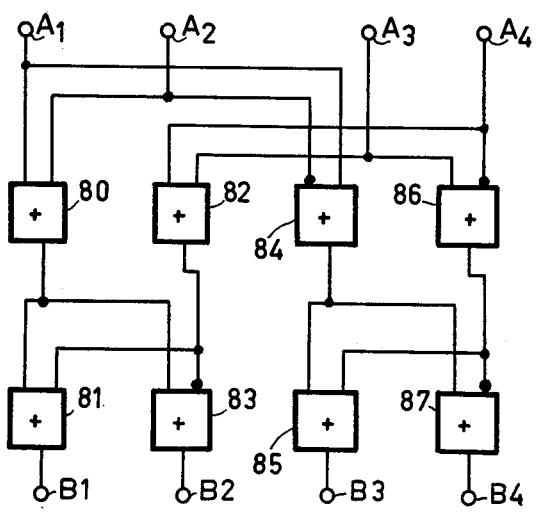
FIG. 6 is a data correlating device.

The processing operations in correlator 6 of FIG. 3 are executed in a device of FIG. 6. The arrangement comprises a plurality of adder/subtractors 80–87. (Subtractors have been indicated by dots on the negative inputs.) The devices 80–87 have two inputs each, thereby necessitating a two levels topology. Adder 80, for example, forms the sum A1 + A2. Devices 83, 84, 86, 87 operate as subtractors. In this way B1, B2, B3, B4 are generated.

In the example referred to above (32 greyness levels) the adder/subtractors operate on input signals of five bits each. Inclusive of the possible carry signals the results therefore may have the following ranges: 0–62 (six bits) for devices 80 and 82; +31/−31 (six bits) for devices 84 and 86; 0–124 (seven bits) for device 81; and +62/−62 for devices 83, 85 and 87 (also seven bits). Devices 80–87 may be constructed from a sequence of one-bit full-adder slices or from general purpose devices which operate on the above described word lengths in parallel.

In FIG. 3 the output signals B2, B3, B4 of correlator 6 are fed back to inputs of the corresponding shift registers 3, 4, 5, respectively by means of a second data input thereto which may be connected via a wired-OR-gate (not shown). The processed data values are fed back into these shift registers during the sixteen processing shift pulses. During this time, no further data values from picture points is introduced on input 15. The shift registers 3, 4 and 5 must have a capacity of at least seven bitcells per shift register stage for accomodating the correlated data values in the above mentioned example. Output signal B1 in FIG. 6 is connected to output 16 of correlator 6 and to the next sub-device 21.

After processing in correlator 6 the data values produced are fed back to shift registers 3, 4, 5 and routed to distributor 7 of sub-device 21. This distributor is similar to distributor 1 for an input picture of 4 × 4 = 16 points. The first data values received, corresponding to a 2 × 2 point submatrix (picture points 1, 2, 9, 10), is transferred to shift register 8. The first stage of shift register 2 at that instant remains empty because no feedback connection has been provided. Data of the subsequent 2 × 2 submatrix is presented to the correlator 6: this second submatrix includes points 3, 4, 11, 12 in FIG. 4. The same processing then prevails. The output signal B1 of this correlation (as described before with respect to distributor 1), is routed by distributor 7 to shift register 9 of sub-device 21. In this way a sequence of $2^N \times 2^{N-2} = 16$ submatrices will produce sequential processing results, while shift register 2 remains empty. The results, B1, of the correlation in device 6 are successively distributed over registers 8–11 of sub-device 21. The sixteen results from output 16 will fill shift registers 8–11 which have four stages each. The sequence controlled by the distributor 7 (with respect to the shift registers 8–11) is the following: 8-9-8-9-10-11-10-11-8-9-8-9-10-11-10-11. The series of output signals from output 16 is organized according to a 4×4 ($2^{N-1} \times 2^{N-1}$) matrix wherein the four first values form the first row and alternate between the first two shift registers 8, 9. The sub-device 21 is not followed by a further subdevice of similar construction. Therefore, the arrangement of FIG. 3 is complete for processing 8×8 point pictures. When, for example, a 16 × 16 point picture is to be processed, the shift registers of a sequence of three sub-devices must have capacities of 64, 16, and 4 stages, respectively.

The filling of shift registers 8–11 can be controlled by the series of 16 shift pulses emanating from AND-gate 103 in FIG. 5, or alternatively, by the stage T(7) in FIG. 5 operate as flipflop 100 does with respect to unblocking the clock pulse input of distribution device 7 (output 121). After all stages of shift registers 8–11 of sub-device 21 have been filled they contain the data values as indicated in FIG. 4c whereby the ranks indicated (1, 3, 17, 19 . . . ) refer to the upper left hand picture points of corresponding submatrices of 2 × 2 points in FIG. 4a. For example "21" refers to the submatrix of points 21, 22, 29, 30 in FIG. 4a. The values stored in shift registers 8–11 are thereupon processed in a correlator 12. Correlator 12 is of similar construction as correlator 6 but receives data having a seven bit range (in the case of 32 different greyness levels) and thus produces results having a nine bit range. The first output of correlator 12 (B1) may be connected with an input of a further sub-device which would then have to operate on only four bits. However, for simplifying the apparatus this output is fed back to the input of shift register 8 which would not otherwise be used. Therefore, after shift registers 8–11 have delivered their contents to correlator 12 and the four resultant data values have been stored in shift registers 8–11, a final correlation step is executed by a correlator 13. Distribution device 7 is controlled by a binary counter 120 (FIG. 5) of similar construction to counter 51 in distribution device 1. For clarity only the output connections thereof are shown. The first stage R(1) controls the position of the second level of switches (corresponding to switches 53, 54); the third stage R(3) controls the position of the first level of switches corresponding to switch 52. The fifth stage R(5) controls the termination of the loading of said shift registers with data (concurrently with their generation at the B1 output of processing device 8) its "1" position being operative for feeding shift pulses in parallel to shift registers 8–11. Thus the data from shift registers 8–11 is forwarded in parallel to correlator 12 and is fed back to the respective inputs of said shift registers. The output of stage R(3) is thereupon operative for blocking the operation of processing device 12 after four further shift pulses. To this effect shift register stage T(7) may have a reset input 122.

The final processing step is executed in correlator 13. Shift register 8 has its four stages connected in parallel to correlator 13 which has a construction corresponding to devices 6 and 12 but operates on nine bit inputs to produce eleven bit output signals. Under control of a single clock pulse (for example, controlled by AND-ing stages R(3) and R(5) and thereafter resetting stage R(5)) the results of the latter processing step are fed back to the corresponding stages of shift register 8, which is accessible in parallel both for reading and writing. After the last mentioned processing step the contents of shift register 8 have been subjected to three correlation steps, the contents of shift registers 9-11 have been subject to two correlation steps; the contents of shift registers 3-5 have been subject to a single correlation step, and shift register 2 remains empty. Processing thereby has been completed.

FIG. 2 is a timing diagram. Line A shows the 64 + 16 + 4 + 1 = 85 shift pulses necessary for controlling the device of FIG. 3 through a complete cycle. Lines B-H show the positions of stages T(1)-T(7), respectively. After shift pulse 64 all stages except T(7) go to their zero position, while the "one" position of stage T(7) controls counter 20. Lines I-M show the positions of stages R(1)-R(5) respectively. After shift pulse 80 stage T(5) goes to the "one" position, whereupon flipflop 100 is reset and counter 51 stops counting. At that instant the "one" position of stage R(5) controls the start of the processing in correlator 12. After shift pulse 84 the "one" position of stage R(3) controls the reset of stage T(7) and counter 120 steps counting. Shift pulse 85 governs the final correlation step and resets stage R(5).

For the read-out of the transformed values the serial outputs of shift registers 3, 4, 5, 8, 9, 10, 11 are connected to terminals of a switch 14. This switch is first connected to the shift register 8 for receiving data under control of four shift pulses to said shift register. This sequence is repeated for shift register 9, and then for shift registers 10 and 11, respectively. Switch 14 is adapted for receiving eleven bits in parallel as the range of values stored in shift register 8. Switch 14 may comprise an electronic demultiplexer device. A sequence of 48 shift pulses is operative for presenting the contents of shift registers 3, 4, 5 to switch 14 which is rotated clockwise after receiving all data from the shift register. For transmission or storing of the transformed picture points (64 data in this example) output 18 is connected to an input of quantizer means which is operative for quantizing the data received, for example according to a Gaussian curve. The quantized data values are translated to code words by known code generating means in device 22. To diminish the effect of noise, signals generated by the storage or transmission of the transformed picture data the code words from device 22 are applied to an input of check character generator 23. Device 23 adds codewords of one or more bits to the sequence of code words received in dependence of the number of errors to be detected and/or corrected. In the embodiment described the addtion of a check-information to the four code words from shift register 8 has the effect that the influence of an error in the remaining codewords leads to an error in only one quarter of the re-transformed picture. If the checking code refers to the first sixteen codewords an error will have effect only in 1/16-th of the reconstituted picture. Generally, code-checking of $2^{(M)} \cdot 2^{(M)}$ codewords restricts the effects of an error to an area of $2^{N-M} \times 2^{N-M}$ picture points. This yields an error detection/correction method with only a small increase of redundancy.

For reconstruction of the original picture or picture part the values which appear at output 19 of the transformation device are fed to a reconstruction device 19A. Therein, the data values received are first routed through an error detection/correction device and thereafter through a requantizer which has a characteristic curve complementary to the characteristic of device 22. The resultant signals are thereupon introduced to a device having the same construction as the one shown in FIG. 3, although the number of bits per codeword received may differ. The reconstruction is controlled by the same sequence of signals as in the transformation device of FIG. 3. After the transformation, the reconstructed picture may be derived from output 18, row by row.

The transformation and reconstruction may be effected by using shift registers as recited. Therein, the stored data values have relative addresses with regard to an initial data point. It is alternatively feasible to perform all storage in random-access memories. This should have the storage capacity of N × N words of sufficient length. Address cycling should be in similar sequence as described herebefore. An advantage of this scheme is that only a single correlator, such as element 6 in FIG. 3, would suffice.

I claim:

1. Apparatus for picture processing comprising an input for receiving digitized data values of picture points situated within a predetermined matrix area of $2^N \times 2^N$ points within a picture according to a predetermined sequence among said points, said input being connected to a first input of a storage means having first and second inputs and first and second outputs and a plurality of separately addressable locations, said apparatus further comprising correlating means having its input connected to said first output and its output connected to said second input for receiving the data values stored in subgroups comprising four of said locations and for multiplying the data of each subgroup with data constituting the basic Hadamard matrix of the second order (H2), for generating the sums of said data and three further correlated data values and for producing the resultant data values on its output, said storage means being adapted for storing data values received on its first and second inputs according to a predetermined first address sequence, said storage means being adapted for accessing all stored data values therein received on its first input and all data values of said sums, only once, according to a predetermined second address sequence and producing the accessed data values in subgroups of 2 × 2 accessed locations on its first output, the data values of each subgroup all having been correlated the same number of times p in said correlating means and representing the digitized data of $2^{p+1} \times 2^{p+1}$ picture points.

2. Apparatus according to claim 1 wherein the maximum value of p = N.

3. Apparatus according to claim 1, wherein said $2^{p+1} \times 2^{p+1}$ picture points represent all picture points within a block of consecutively arranged picture points.

4. Apparatus as claimed in claim 1 wherein said storage means comprises a random access storage and an address sequencer for generating a plurality of address sequences for executing a read-process-write operation on the data contained therein.

5. Apparatus according to claim 1, wherein said storage means include means for producing, after termination of said second address sequence, the digitized data values stored therein according to a third address sequence at its second output said second output being connected to an input of quantizer means which function to generate quantized digital data values.

6. Apparatus as claimed in claim 5 wherein an output of said quantizer means is connected to an input of an error detection-code generator.

7. Apparatus as claimed in claim 5, wherein an output of said apparatus is connected to an input of means for receiving digitized and correlated digital data values of picture points and for reconstructing the original picture point data values therefrom, said apparatus including an input for receiving a matrix of $2^N \times 2^N$ processed data values according to a predetermined sequence, said input being connected to a first input of a storage means having first and second inputs and first and second outputs and a plurality of separately addressable locations, said apparatus further comprising further correlating means having an input connected to said first output and its output connected to said second input for receiving the data values stored in a subgroup comprising four of said locations and for multiplying the data values of each subgroup with data values constituting the basic Hadamard matrix of the second order (H2) for generating the sums of said data values and three further correlated data values and for producing the resultant data values on its output, said storage means being adapted for storing data values received on its first and second inputs according to a predetermined first address sequence, said storage means being adapted for accessing all stored data values therein received on its first input and all data values of said sums, only once, according to a predetermined second address sequence and producing the accessed data values in subgroups of $2 \times 2$ accessed locations on its first output, the data values of each subgroup all having been correlated the same number of times p in said further correlating means and representing the digitized data values of $2^{p+1} \times 2^{p+1}$ received data values.

8. Apparatus according to claim 1, wherein said storage means include means for producing the digitized data stored therein according to a third address sequence at its second output after termination of said second address sequence, said third sequence starting with those data values which have been correlated p times followed by those data values which have been correlated (p−1) times, the third address sequence for the highest value of p starting with a partial sequence of said sums, and furthermore comprising for each value of p first, second and third partial sequences, the first partial sequence thereof including correlated data values indicating a brightness variation along a first scanning direction within said subgroup, the second partial sequence thereof including correlated data values indicating a brightness variation along a second scanning direction, and the third partial sequence thereof including the remaining correlated data values.

9. Apparatus as claimed in cliam 8, wherein for each value of p up to a predetermined maximum value of p = N−1 said storage means comprises four shift registers having their outputs connected in parallel to inputs of said correlating means for presenting thereto four digital data values, A1, A2, A3, A4 in parallel.

10. Apparatus as claimed in claim 9, whereby said correlating means includes arithmetic means for forming the respective digital values:

$$A1 + A2 + A3 + A4 = B1$$

$$A1 - A2 + A3 - A4 = B2$$

$$A1 + A2 - A3 - A4 = B3$$

$$A1 - A2 - A3 + A4 = B4.$$

11. Apparatus as claimed in claim 9 wherein, whereby the digital data values B2, B3, B4 are fed back to inputs of the same shift registers where three of the data values A1–A4 had been stored.

12. Apparatus as claimed in claim 9, wherein for correlating data values for the 1st, 2nd, 3rd ... pth time up to at most the (N−1)st time said four shift registers have a capacity of $2^{2N-2}, 2^{N-4}, 2^{2N-6}$ ... stages, each stage accommodating one complete data value to be correlated four at a time.

* * * * *